United States Patent [19]

Oberländer et al.

[11] Patent Number: 5,372,866
[45] Date of Patent: Dec. 13, 1994

[54] TRANSPARENT PLASTIC PANELS HAVING BIRD PROTECTION, AND USE THEREOF AS SOUND BARRIERS

[75] Inventors: Klaus Oberländer, Hanau; Norbert Brand, Darmstadt, both of Germany; Peter Seelman, Vienna; Heinz Wachter, Ebergassing, both of Austria

[73] Assignee: Degussa Aktiengesellschaft, Frankfurt, Germany

[21] Appl. No.: 2,382

[22] Filed: Jan. 11, 1993

Related U.S. Application Data

[63] Continuation-in-part of Ser. No. 944,428, Sep. 14, 1992, abandoned.

[30] Foreign Application Priority Data

Sep. 13, 1991 [DE] Germany ............... 4130467

[51] Int. Cl.⁵ .......................... E01F 8/00; E04B 1/82
[52] U.S. Cl. ...................... 428/110; 52/309.1; 52/309.7; 428/203; 428/220; 428/255; 428/294; 428/339
[58] Field of Search .............. 428/110, 203, 255, 220, 428/294, 339; 52/309.1, 309.7

[56] References Cited

U.S. PATENT DOCUMENTS

| | | | |
|---|---|---|---|
| 2,519,474 | 8/1950 | Jackson et al. | 428/255 |
| 3,567,566 | 3/1971 | Bandell et al. | 428/110 |
| 4,631,214 | 12/1986 | Hasegawa | 428/255 |
| 5,040,352 | 8/1991 | Oberlander et al. | |
| 5,160,782 | 11/1992 | Hickman | 428/245 |
| 5,219,630 | 6/1993 | Hickman | 428/255 |

FOREIGN PATENT DOCUMENTS

| | | |
|---|---|---|
| 0407852 | 7/1990 | European Pat. Off. |
| 1881285 | 9/1963 | Germany. |
| 8314371 | 5/1983 | Germany. |
| 9101234 | 4/1991 | Germany. |

Primary Examiner—James C. Cannon
Attorney, Agent, or Firm—Cushman, Darby & Cushman

[57] ABSTRACT

Transparent plastic panels, particularly those used in noise-reducing barriers, are provided with bird-protecting means comprising plastic threads which are embedded by casting in the panels and are of such high-contrast that they can be seen by birds. The threads also prevent the panel from fracturing. Preferably the plastic threads are of black dyed polyamide and have a thickness of about 2 mm.

16 Claims, 1 Drawing Sheet

TRANSPARENT PLASTIC PANELS HAVING BIRD PROTECTION, AND USE THEREOF AS SOUND BARRIERS

This is a continuation-in-part of application Ser. No. 07/944,428, filed Sep. 14, 1992, now abandoned.

The present invention relates to transparent plastic panels having embedded monofilament plastic fibers adapted to reduce fracturing or prevent the fragmentation of the panels if they are broken. Plastic panels of this kind are particularly suitable as noise barriers.

BACKGROUND OF THE INVENTION

Noise barriers of this kind are described in published European Application EP 0 407 852 A2 15 (U.S. Pat. No. 5,040,352). They are excellent at preventing loose fragments from being formed and falling out. Strips, ornaments or shapes can also be embedded in the panels which can be seen by birds and so protect them from flying into the panels accidentally.

Austrian patent specification 263 298 discloses a translucent structural panel in which a partly metal-coated fabric is embedded by casting. The fabric reinforces the structural panel, but cannot prevent individual fragments from forming in the event the panel breaks; owing to the high strength of the plastic used in the structural panel, the thread breaks at the same time as the panel. In addition, the fine lights in the fabric prevent the structural panel from being transparent, so that the panels are suitable only as lighting elements and not as window-panes. Also, metal-coated fabric can cause reflexes or reflections which detract from the appearance of the panels and also may appear to be transparent from one side without being so.

DE-U-84 35 283 discloses transparent structural panels comprising external cables which trap and secure any parts which are produced by a fracture. The fragments in question are relatively large and can break into other, free fragments which are still relatively large. Conventional strips or the like can be added to these known panels as protection for birds.

The "Schweizer Ingenieur und Architekt", No. 13, (1988), pages 379 and 380 discloses sound-insulating panels which disintegrate into loose fragments in the event of breakage. To protect birds, vertical strips, e.g. 5 mm wide, can be etched on the panels. This additional complexity is expensive, increases the risk of damaging the appearance of the panel and is unsightly.

Since it is expensive to embed bird-protecting elements in the plastic panels, which are cast in one piece or are laminated by being made up of individual cast plates, in practice bird-protecting symbols or elements are often adhered to the outside of the plastic panels. However, the externally-adhered bird-protecting elements are subject to weathering and interfere with cleaning the panels. They have the further disadvantage of spoiling the appearance of the panels, and the advantage of transparency is largely lost. If individual silhouettes of birds of prey are adhered to the panels, they do not disturb the environment, but a few silhouettes of birds of prey are more for appearance than a protection for birds.

SUMMARY OF THE INVENTION

The object of the present invention, therefore, is to provide a plastic panel of the kind described above which protects birds without disturbing the environment. A further object of the present invention is to retain the appearance of a transparent plastic panel without the need for complicated or expensive procedures.

These and other objects are provided in a transparent plastic panel of the kind described above in which the inner plastic fibers are of high-contrast.

The term "high contrast", as used herein, refers to plastic which has a transmission ratio between 0 and 65% (measured according to DIN 5033 (colorimetry) and 5036 (radiometric and photometric properties of materials)). Preferably, the material or the actual plastic thread has a transmission ratio of 0 to 30%, more particularly 0 to 10%. A transmission ratio of about 0% is particularly advantageous. To obtain contrast also, the plastic thread must stand out from the background, e.g., by having a different color. Metal-coated threads are unsuitable for this purpose if, for example, they reflect the sky in front of the panel against the sky behind the panel or give undesired reflexes or reflections, e.g. of the sun. It is advantageous to use dark threads, particularly black threads. Owing to the high-contrast of the threads, flying birds can recognize the transparent wall as an obstacle before they fly into it, and while they are a few meters away, and can fly around the plastic wall.

In particularly advantageous embodiments, the plastic threads are 1 mm to 5 mm thick. More particularly the thickness range from 1.8 to 3.0 mm, preferably 2.0 to 2.5 mm, has been found particularly advantageous with regard to the required properties, i.e. easy insertion into the plastic panel, sufficient strength in the event of a fracture, sufficient protection of birds and no substantial impairment of the overall transparency of the pane.

Usually the threads in the panel extend horizontally, since the panels are clamped at their sides; in that case the cohesion in the event of a fracture is particularly advantageous. Usually the threads are laid parallel to one another. If desired or necessary, two layers of threads can be incorporated in the panel and will then preferably extend in two directions, an angle of 90° between threads of different layers being particularly advantageous. From the outside, this embodiment looks like a gauze fabric.

Usually the distance between neighboring threads is not greater than 100 mm, since greater distances markedly decreases the protection of birds or the prevention of fragmentation. Preferably, the distance between threads is up to 50 mm, particularly when the threads are horizontal, since birds appear to recognize horizontal obstacles less easily than vertical obstacles.

The surface density of the high-contrast threads, i.e. the percentage of the surface of the entire plastic panel which is covered by the threads (the surface density), is usually from 2.5 to 25%. Preferably, particularly in the case of horizontal threads, the surface density is at least 5%, particularly advantageously 6 to 10%. In the case of vertical threads, the surface density can be slightly less, so that, in this case, the advantageous range is from 5 to 8%. Below this surface density, the bird-protecting effect is rapidly lost, whereas above these values the threads remain visible at a greater distance and detract from the appearance, i.e. the advantageous transparency of the plastic panel is largely wasted.

Typical panel thicknesses are 4 to 40 mm, preferably 12 to 25 mm. The panels are usually manufactured in sizes of 1.5×1 m to 2×3 m. Larger or smaller sizes are possible for special uses.

The panels are usually substantially transparent, preferably colorless or slightly tinted, e.g. smoky brown. Colorless transparent plastic panels usually have a transmission ratio of at least 70%. A ratio of 90 to 95% is advantageous. Tinted embodiments usually have a transmission ratio of 45 to 75%, for example between 50 and 60%. The absorption of the threads and of the tinted panel is cumulative, so that the threads are additionally recognizable as high-contrast elements.

The invention will be explained in detail with reference to a drawing of an embodiment.

BRIEF DESCRIPTION OF THE FIGURE OF THE DRAWING

FIG. 1 shows an embodiment of the invention in perspective, partially in section.

DETAILED DESCRIPTION OF PREFERRED EMBODIMENT

Figure 1:
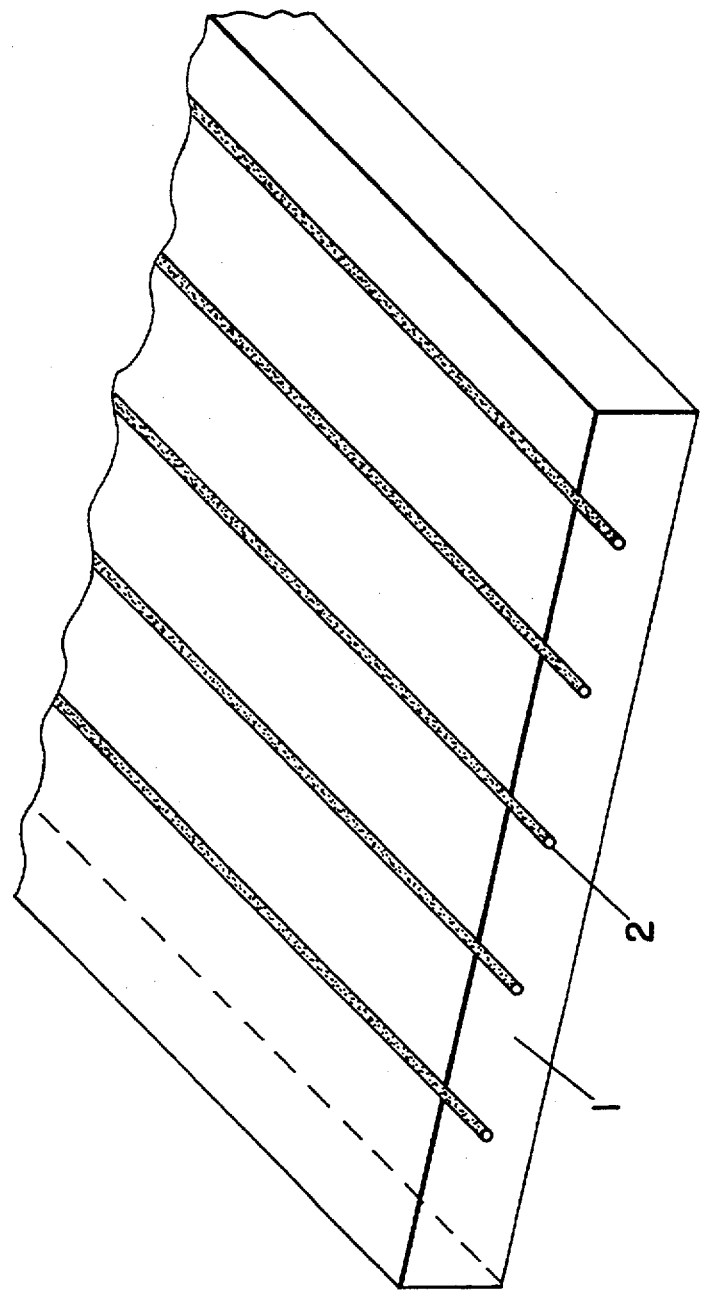

The drawing shows a transparent plastic panel 1 according to the invention. The panel is composed of acrylic glass (poly methyl methacrylate), with a thickness of 20 mm. The internal plastic threads 2 are monofilaments and made of black-dyed polyamide. The transmission ratio of the black polyamide is substantially 0%. The panel material is transparent and has a light transmission of 92%. The polyamide fibers 2 have a diameter of 2.0 mm and are disposed at an average spacing of 30 mm, corresponding to a surface density of plastic fibers of 6.7%.

In a field test, a panel of the aforementioned kind measuring 2×2 meters was manufactured together with an equal-sized pane which had non-dyed (i.e. transparent) polyamide fibers of similar size and similar surface density, and a panel on which conventional bird-protecting strips were adhered. The black-dyed threads were clearly visible to a normal-sighted person at a distance of 6 meters, but did not detract from the appearance. The black-tinted polyamide threads were still visible at a distance of 10 meters, but were not noticeable to a passing observer. At a distance of 20 meters the black polyamide threads could be seen only with difficulty, and there was practically no visible difference from the plastic panel which had transparent polyamide threads. By comparison, the conventional transparent panels with bird protection were noticeable at a distance of 20 meters, whether with strips or with a pattern of squares. The conventional panels having adhered patterns looked considerably worse than the panel according to the invention, and the view through the panel was greatly impeded.

The panel according to the invention had the additional advantage of being less expensive to make than conventional panels with bird protection, and was easier to clean with water, owing to the smooth surface.

What is claimed is:

1. In a transparent plastic panel having internal nonmetallic plastic threads of diameter 1–5 mm, the improvement in which the threads are high-contrast, said threads providing sufficient strength to hold together any fragments of said panel produced if said panel is fractured, having sufficient contrast to be recognized by birds flying in the vicinity of said panel and causing no substantial impairment of the overall transparency of the panel.

2. A transparent plastic panel as set forth in claim 1 in which the contrast of the plastic threads is 0 to 30%.

3. A transparent plastic panel as set forth in claim 2 in which the contrast of the plastic threads is 0 to 10%.

4. A transparent plastic panel as set forth in claim 3 in which the contrast of the plastic threads is 0%.

5. A transparent plastic panel according to claim 1 in which the threads are dyed black.

6. A transparent plastic panel according to claim 1 or claim 2 in which the threads are monofilaments.

7. A transparent plastic panel according to claim 1 in which the threads have a thickness in the range from 1.8 mm to 2.5 mm.

8. A transparent plastic panel according to any one of claims 1–5 in which the threads extend horizontally.

9. A transparent plastic panel according to claim 8 in which the distance between threads is not more than 50 mm.

10. A transparent plastic panel according to claim 9 in which the surface density of the threads is between 5 and 25%

11. A transparent plastic panel according to any of claims 1 to 5, characterized in that the threads extend vertically.

12. A transparent plastic panel according to claim 11 in which the distance between threads is not more than 100 mm.

13. A transparent plastic panel according to claim 9 in which the surface density of the threads is between 2.5 and 20%.

14. A transparent plastic panel according to claim 1 in which the thickness of the panel is from 4 to 40 mm.

15. A transparent plastic panel according to claim 1, in which the thickness is in the range from 12 to 25 mm.

16. A noise barrier comprising a transparent plastic panel according to claim 1 and means mounting said panel in a location adjacent to a source of noise.

* * * * *